United States Patent
Onishi

(10) Patent No.: US 8,743,232 B2
(45) Date of Patent: Jun. 3, 2014

(54) IMAGE PROCESSING DEVICE AND COMPUTER READABLE MEDIUM

(75) Inventor: Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 381 days.

(21) Appl. No.: 13/086,469

(22) Filed: Apr. 14, 2011

(65) Prior Publication Data

US 2012/0147206 A1    Jun. 14, 2012

(30) Foreign Application Priority Data

Dec. 14, 2010  (JP) ................................ 2010-278627

(51) Int. Cl.
H04N 5/225  (2006.01)
(52) U.S. Cl.
USPC ....................................................... 348/222.1
(58) Field of Classification Search
None
See application file for complete search history.

(56) References Cited

U.S. PATENT DOCUMENTS

| | | | | |
|---|---|---|---|---|
| 6,940,664 | B1 * | 9/2005 | Pilu ............................... | 359/806 |
| 7,027,171 | B1 * | 4/2006 | Watanabe ..................... | 358/1.15 |
| 2006/0164526 | A1 * | 7/2006 | Suzuki et al. ................. | 348/239 |
| 2007/0280554 | A1 * | 12/2007 | Chernichenko et al. ...... | 382/275 |
| 2009/0060388 | A1 | 3/2009 | Shingai et al. | |
| 2010/0231609 | A1 | 9/2010 | Chatting et al. | |
| 2010/0245597 | A1 * | 9/2010 | Pai et al. .................... | 348/207.1 |
| 2011/0285874 | A1 * | 11/2011 | Showering et al. ...... | 348/231.99 |

FOREIGN PATENT DOCUMENTS

| | | |
|---|---|---|
| JP | 2001-134751 A | 5/2001 |
| JP | 2006-128918 A | 5/2006 |
| JP | 2008-193218 A | 8/2008 |

OTHER PUBLICATIONS

Communication, dated Apr. 10, 2013, issued by the Australian Patent Office in counterpart Australian Patent Application No. 2011201616.

* cited by examiner

*Primary Examiner* — Sinh Tran
*Assistant Examiner* — Jason Flohre
(74) *Attorney, Agent, or Firm* — Sughrue Mion, PLLC

(57) ABSTRACT

An image processing device includes a dimension information acquisition unit that acquires dimension information specifying dimensions of a target image formed by extracting a region of a target of an image containing the target, picked up by image pickup unit. The image processing device further includes a pickup image quality information acquisition unit that acquires pickup image quality information indicating an image quality of the region of the target in the pickup image picked up by the image pickup unit; and a resolution acquisition unit that acquires a resolution of the region of the target when the region of the target is formed in the dimensions based on the dimension information and the pickup image quality information.

10 Claims, 7 Drawing Sheets

300

302

303

IMAGE PROCESSING DEVICE AND COMPUTER READABLE MEDIUM

CROSS-REFERENCE TO RELATED APPLICATION

This application is based on and claims priority under 35 USC 119 from Japanese Patent Application No. 2010-278627 filed on Dec. 14, 2010.

BACKGROUND

1. Technical Field

This invention relates to an image processing device and a computer readable medium.

2. Related Art

An image processing device including an image pickup function, such as a digital camera or a mobile telephone with a camera function performs edit processing of trimming image data of a pickup image acquired by image pickup means, etc., and display processing of displaying the picked-up image on a display, etc.

SUMMARY

According to an aspect of the invention, an image processing device comprising:

a dimension information acquisition unit that acquires dimension information specifying dimensions of a target image formed by extracting a region of a target of an image containing the target, picked up by image pickup unit;

a pickup image quality information acquisition unit that acquires pickup image quality information indicating an image quality of the region of the target in the pickup image picked up by the image pickup unit; and a resolution acquisition unit that acquires a resolution of the region of the target when the region of the target is formed in the dimensions based on the dimension information and the pickup image quality information.

BRIEF DESCRIPTION OF THE DRAWINGS

Exemplary embodiments of the invention will be described in detail based on the following figures, wherein.

DETAILED DESCRIPTION

Figure 1:
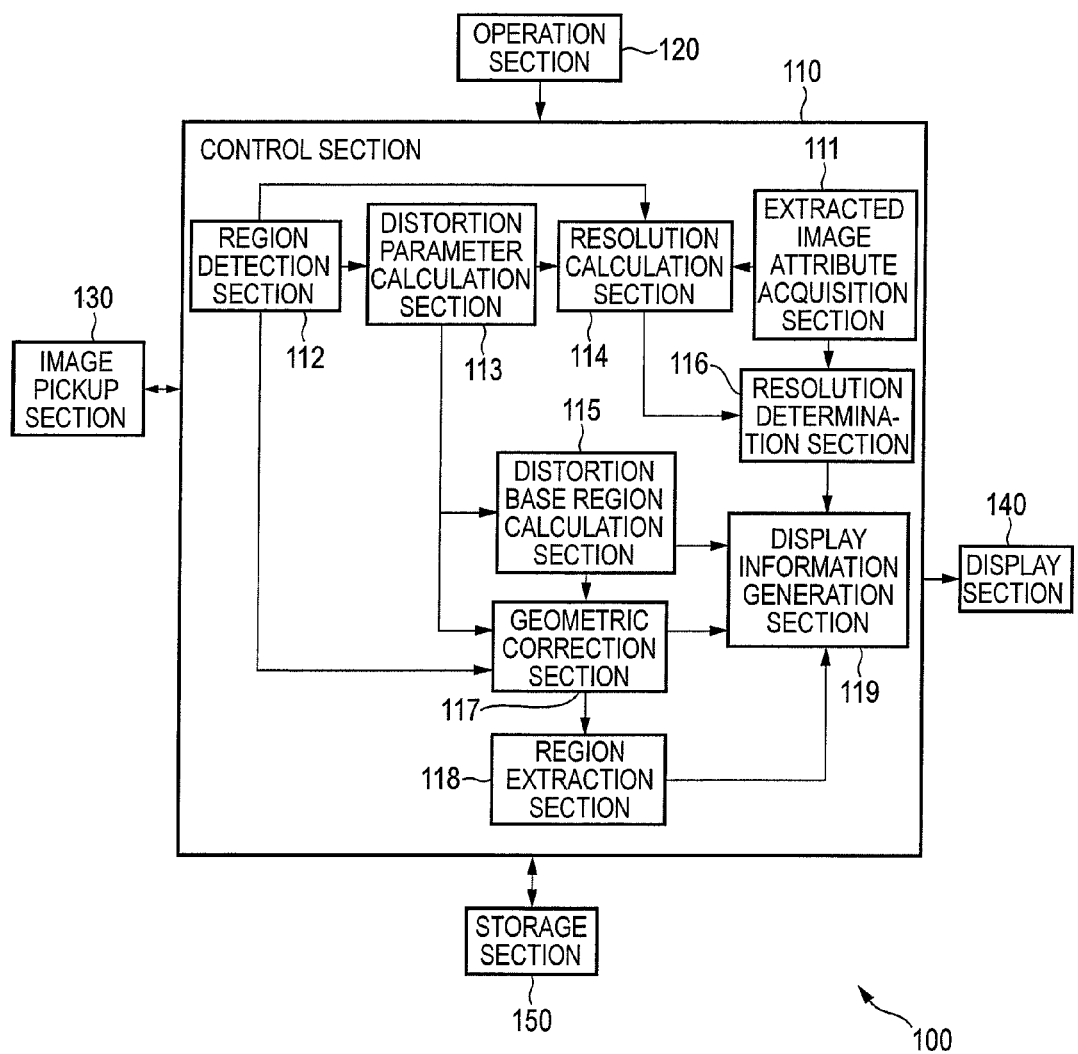
FIG. 1 is a block diagram to show the configuration of an image processing device according to an exemplary embodiment of the invention.
Figure 2A:
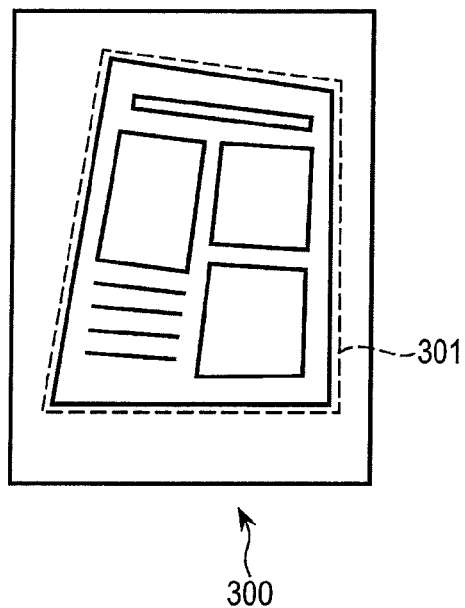
FIGS. 2A-2C are a drawing to show an example of image data generated in the image processing device according to the exemplary embodiment of the invention.
Figure 2B:
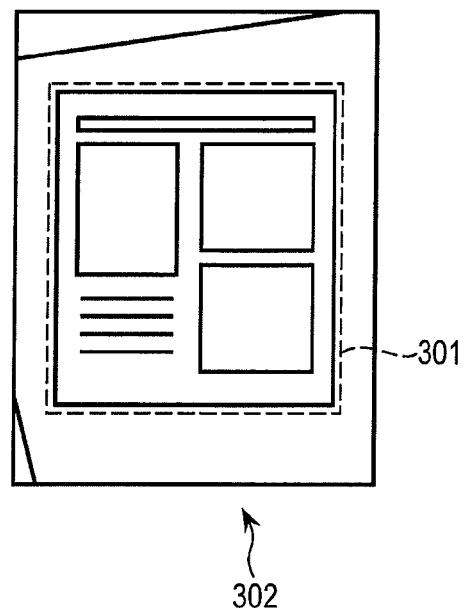
Figure 2C:
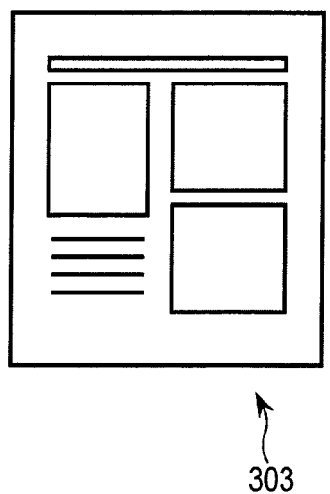

A preferred exemplary embodiment for carrying out the invention (simply, exemplary embodiment) will be discussed below according to the accompanying drawings:

FIG. 1 is a block diagram to show the configuration of an image processing device 100 according to the exemplary embodiment of the invention. FIGS. 2A-2C is a drawing to show an example of image data generated in the image processing device 100 according to the exemplary embodiment of the invention. Before picking up a pickup image 300 containing a target, the image processing device 100 accepts input of information indicating the dimensions of an image of a target (target image 303) formed by extracting a region of the target (target region 301) from the pickup image 300 and objective resolution of the image. The image processing device 100 acquires the resolution of the target image 303 when the target image 303 actually acquired by later image pickup is formed in specified dimensions, further determines whether or not the acquired resolution is equal to or more than the target resolution, etc.

The image processing device 100 is made up of a control section 110, an operation section 120, an image pickup section 130, a display section 140, and a storage section 150.

The control section 110, the operation section 120, the image pickup section 130, and the display section 140 are a CPU, etc., and operate in accordance with a program stored in the storage section 150.

The control section 110 includes an extracted image attribute acquisition section 111, a region detection section 112, a distortion parameter calculation section 113, a resolution calculation section 114, a distortion base region calculation section 115, a resolution determination section 116, a geometric correction section 117, a region extraction section 118, and a display information generation section 119. Processing executed by the sections is described later.

The operation section 120 generates a signal based on operation by the user of the image processing device 100 for various keys provided for the image processing device 100 and a touch panel display 200 described later.

The image pickup section 130 causes image pickup means of a CCD camera, etc., connected to the image processing device 100 to execute image pickup processing based on a signal input from the control section 110. The image pickup section 130 acquires image data of the pickup image 300 picked up containing a target by the image pickup means and outputs the image data to the control section 110.

The display section 140 causes the touch panel display 200 (not shown) connected to the image processing device 100 to display an image based on a signal input from the control section 110. The touch panel display 200 has a function of generating a signal based on a touch to the touch panel display 200 with a finger of the user, etc., in addition to the function of displaying an image, and the generated signal is input to the operation section 120.

The storage section 150 is memory, etc., and stores a program executed by the control section 110, data of the pickup image 300 acquired by the image pickup section 130 and the target image 303 extracted by the region extraction section 118, various pieces of data generated in processing in the control section 110.

The operation of the control section 110 will be discussed below in detail: The control section 110 has the extracted image attribute acquisition section 111, the region detection section 112, the distortion parameter calculation section 113, the resolution calculation section 114, the distortion base region calculation section 115, the resolution determination section 116, the geometric correction section 117, the region extraction section 118, and the display information generation section 119.

Figure 3:
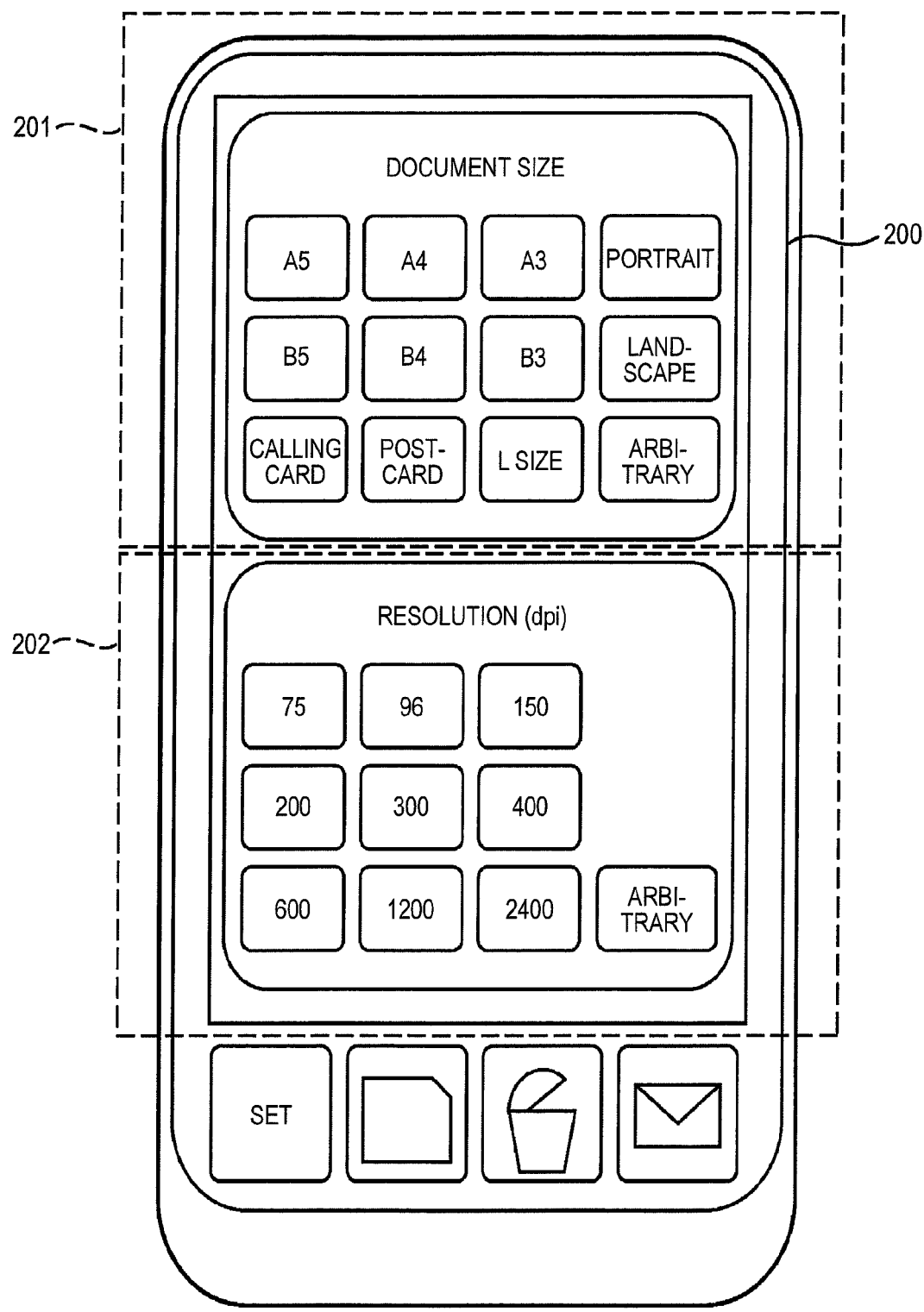
FIG. 3 is a drawing to show an example of display of a touch panel display.

The extracted image attribute acquisition section 111 acquires extracted image attribute information from a signal input from the operation section 120 based on operation of the user. The extracted image attribute information is information indicating the attribute of the target image 303, acquired by the image processing device 100 and contains dimension information and resolution specification information. The dimension information is information specifying the dimensions of the target image 303; for example, it is acquired as information specifying any of document sizes of A4, A3, etc. In the exemplary embodiment, the dimensions of the target image 303 are actual dimensions of the target; for example, to pick up an image of a document of the A4 size, the A4 size is specified as the dimensions of the image, and the target image 303 is acquired as an image displaying the description of the document in the A4 size of the actual dimensions of the document. The resolution specification information is information specifying the resolution (the number of pixels per unit length) when the target image 303 is formed in the dimensions specified in the dimension information. The extracted image attribute information is input in such a manner that the user selects out of a menu displayed on the touch panel display 200. FIG. 3 is a drawing to show an example of display of the touch panel display 200. The user selects out of a size menu 201 and a resolution menu 202 displayed on the touch panel display 200 by touching any of displayed keys, thereby inputting dimension information and resolution specification information.

The region detection section 112 performs edge detection of detecting a sharp change point in a color tone and brightness, edge joint of joining them, contour detection from the joined edges, and region vertex detection of detecting a flexion point of contours as a vertex according to a known subject recognition technique in the pickup image 300 picked up by the pickup means, and detects the target region 301 where the target is displayed.

The distortion parameter calculation section 113 calculates the following information (distortion parameters) based on the shape of the target region 301 detected by the region detection section 112. The distortion parameter calculation section 113 acquires position information (coordinates) of a plurality of vertexes of the target region 301 and calculates the length of a diagonal line of the target region 301 from them. The distortion parameter calculation section 113 also calculates a conversion coefficient for converting the shape of the target region 301 detected by the region detection section 112 into the shape indicated by the dimension information.

The conversion coefficient will be discussed below: The target region 301 detected from the pickup image 300 has a shape with distortion (projection distortion) relative to the actual target shape because of the angle of a CCD camera of image pickup means with respect to the target. The conversion coefficient for converting the actual target shape and points in the target into the shape of the target region 301 with distortion and points inside the region (shape) may be represented as a 3×3 matrix. The conversion coefficient is acquired from the coordinates of the corresponding four points before and after the conversion in accordance with a known technique described in JP-A-2001-134751, for example.

The resolution calculation section 114 calculates the resolution of an image when the target region 301 detected by the region detection section 112 is displayed in the dimensions indicated by the dimension information acquired by the extracted image attribute acquisition section 111. First, the resolution calculation section 114 acquires the resolution of the pickup image 300 as information indicating the image quality of the target region 301. The resolution calculation section 114 acquires the resolution of the target region 301 when the target region 301 is formed in the dimensions indicated by the dimension information based on the dimension information and information indicating the image quality of the target region 301. Specifically, the resolution calculation section 114 multiplies the acquired resolution of the pickup image 300 of a quadrangle by (length of a diagonal line (A) calculated by the distortion parameter calculation section 113)/(length of a diagonal line corresponding to the diagonal line (A) in the dimensions indicated by the dimension information), thereby acquiring the resolution when the target region 301 is displayed in the dimensions indicated by the dimension information acquired by the extracted image attribute acquisition section 111. The shortest one of the diagonal lines calculated by the distortion parameter calculation section 113 is used as the used diagonal line (A). Accordingly, the resolution on the shortest one of the diagonal lines is acquired. The resolution is a resolution at a position where the resolution becomes lower as a result of distortion correction processing described later, and the resolution is made equal to or more than the resolution specified in the resolution specification information (specified resolution), whereby the resolution of the target image 303 obtained as a result of the distortion correction processing becomes equal to or more than the specified resolution in all regions.

Figure 4:
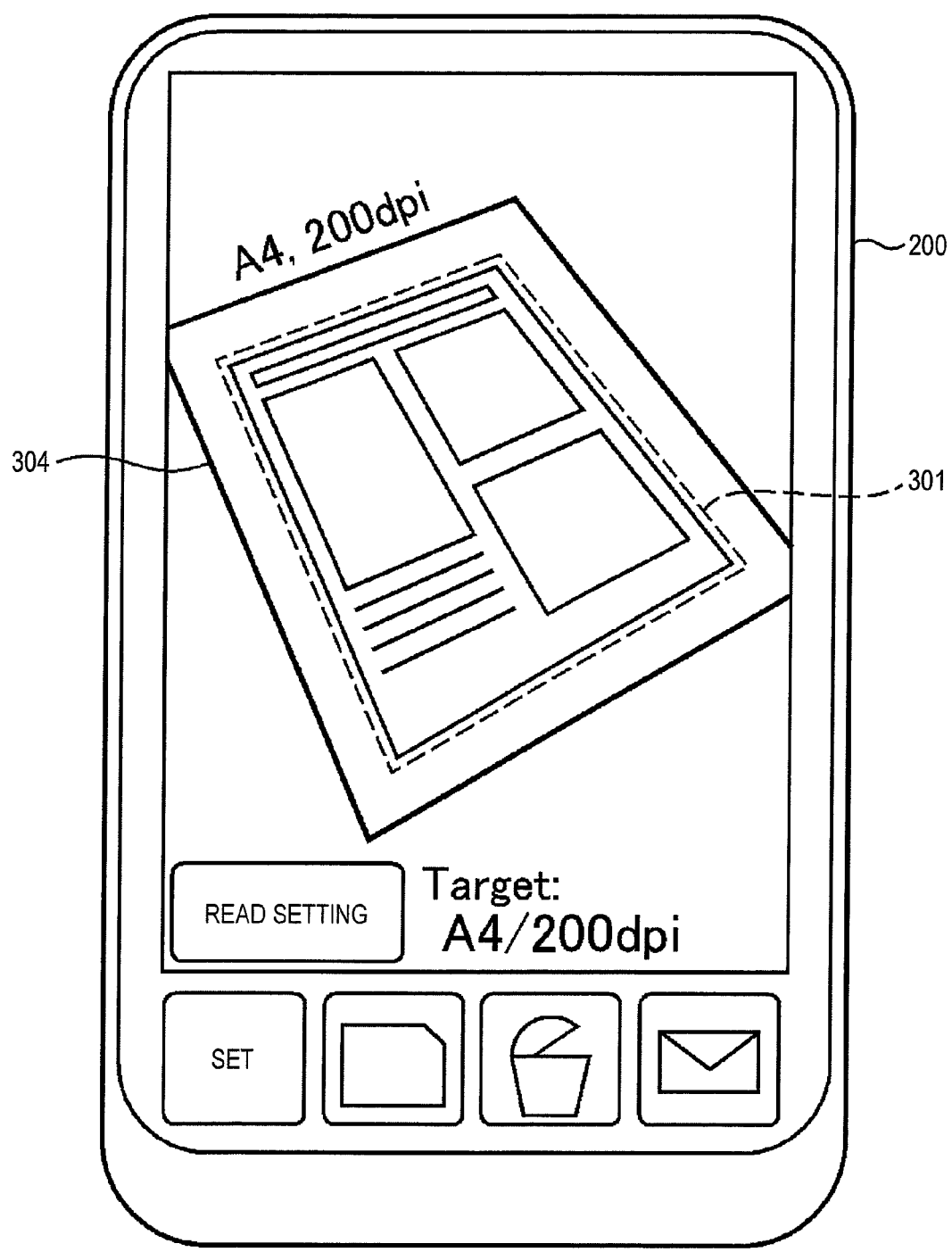
FIG. 4 is a drawing to show an example of display of the touch panel display.

The distortion base region calculation section 115 generates information indicating a distortion base region 304 using the conversion coefficient generated in the distortion parameter calculation section 113, and outputs the information to the display information generation section 119. The distortion base region 304 is the minimum target region (objective target region) such that an image of the specified resolution by the resolution specification information may be acquired. The distortion base region 304 is acquired by scaling up or down the shape indicated in the dimension information a factor of (specified resolution by the resolution specification information/resolution of the pickup image 300) and further converting according to the conversion coefficient. The distortion base region 304 is overlapped on the pickup image 300 for display by the display information generation section 119 described later. FIG. 4 is a drawing to show an example of display of the touch panel display 200. If the size of the target region 301 is equal to or more than the size of the distortion base region 304 (namely, if a target image of a resolution equal to or more than the specified resolution may be acquired), the distortion base region 304 is displayed in a blue frame; if the size of the target region 301 is smaller than the size of the distortion base region 304 (namely, if a target image of a resolution equal to or more than the specified resolution may not be acquired), the distortion base region 304 is displayed in a red frame, thereby notifying the user whether or not the target image of the specified resolution may be acquired. Display processing is described later.

The resolution determination section 116 determines whether or not the resolution calculated in the resolution calculation section 114 is equal to or more than the specified resolution specified by the resolution specification information, and outputs the determination result to the display information generation section 119.

The geometric correction section 117 performs distortion correction processing for the pickup image acquired in the image pickup section 130. The distortion correction processing is processing of correcting the shape and the display of the pickup image 300 so that the shape of the target in the pickup image 300 becomes a shape based on the actual shape for the pickup image 300 of the target picked up as a different shape (for example, a trapezoid) from the actual shape (for example, rectangle) because of projection distortion; the processing is executed by converting the pickup image 300 according to an inverse vector of the conversion coefficient calculated in the distortion parameter calculation section 113. The distortion correction processing is performed for the pickup image 300 shown in FIG. 2A and the pickup image 302 shown in FIG. 2B is generated. The target region 301 is a region larger than the target to enhance visibility of the dashed line indicating the target region 301; in fact, the line stipulating the target region 301 is on the visible outline of the target.

The region extraction section 118 extracts image data of the target region 301 from the pickup image 302 corrected by the geometric correction section 117, forms in the dimensions specified in the dimension information, generates the target image 303, and outputs data of the generated target image 303 to the display information generation section 119. An example of the target image 303 is shown in FIG. 2C.

The display information generation section 119 generates display information displayed on the touch panel display 200 by the display section 140. As the display information, a part or all of the pickup image 300 picked up by the image pickup means, the pickup image 302 corrected by the geometric correction section 117, the target image 303 generated by the region extraction section 118, a menu screen operated by the user, and further indication information to acquire an image of the resolution specified by the resolution specification information for the user are displayed.

The indication information is as follows: The indication information is displayed in an example of a screen displayed on the touch panel display shown in FIG. 4. In the example in FIG. 4, the distortion base region 304 is displayed as the indication information. The user moves the image pickup means (CCD camera) and picks up the pickup image 300 so that the target region 301 in the pickup image 300 is displayed larger than the distortion base region 304, whereby an image of the specified resolution specified by the resolution specification information may be acquired.

The distortion base region 304 is displayed so that the intersection point of the orthogonal lines matches the intersection point of orthogonal lines of the target region 301.

As the command information, a message indicating whether or not the resolution is equal to or more than the resolution specified by the resolution specification information based on the determination result input from the resolution determination section 116, a message for prompting the user to bring the CCD camera close to the target if the resolution does not satisfy the resolution specified by the resolution specification information, etc., may be displayed.

Figure 5:
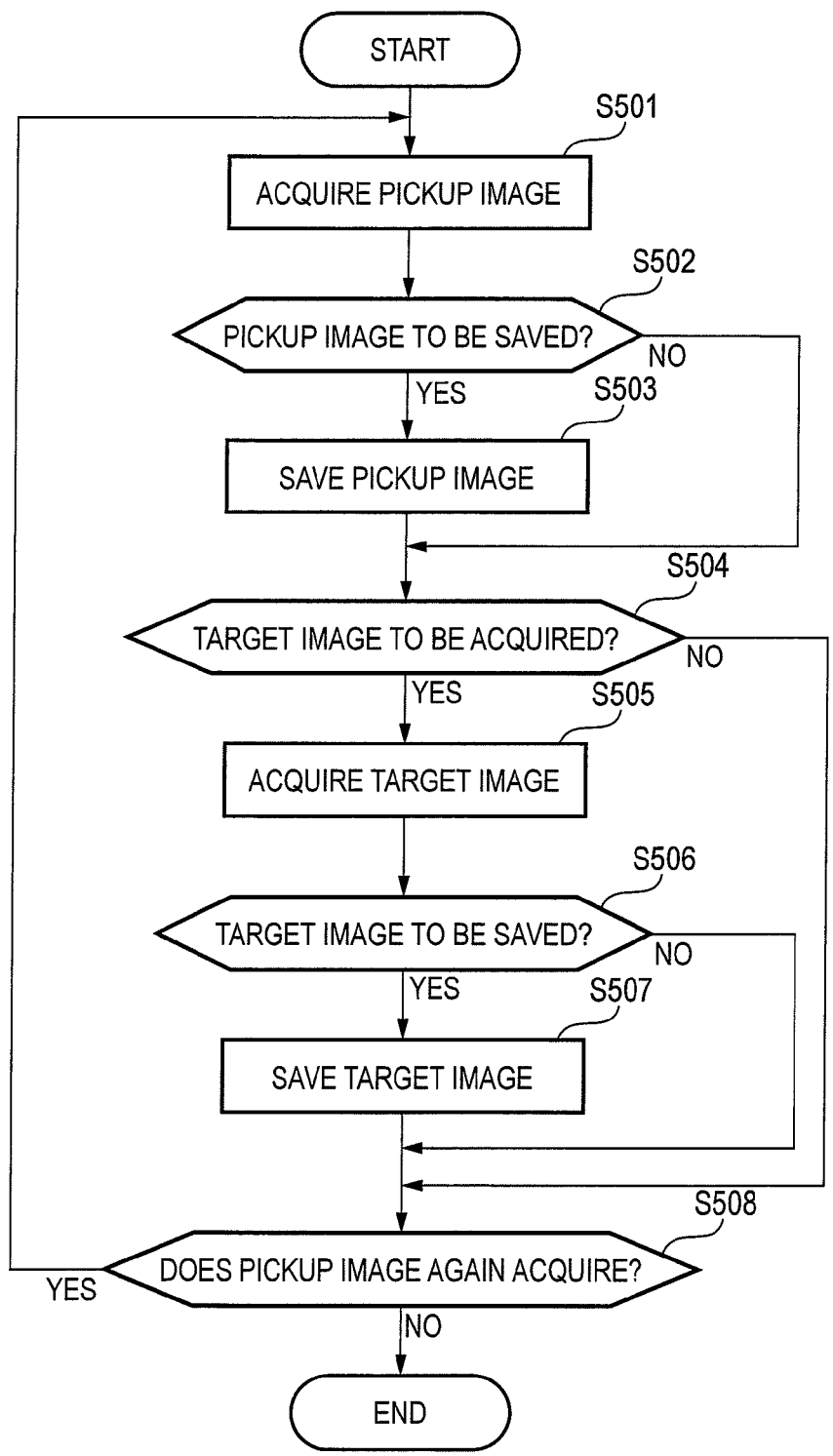
FIG. 5 is a flowchart to show the processing executed in the image processing device according to the exemplary embodiment of the invention.

Next, processing executed in the image processing device 100 will be discussed with a flowchart. FIG. 5 is a flowchart to show the processing executed in the image processing device 100 according to the exemplary embodiment of the invention.

First, the image processing device 100 executes acquisition processing of the pickup image 300 (S501). Next, the image processing device 100 displays an image for requesting the user to choose whether or not saving of the pickup image 300 acquired at S501 is required on the touch panel display 200 (S502). If the user specifies that saving the image is required, the image data of the displayed pickup image 300 is saved in the storage section 150.

After the saving processing at S503 or if the user specifies that saving the image is not required at S502, the image processing device 100 displays an image for requesting the user to choose whether or not execution of acquisition processing of the target display 303 is required on the touch panel display 200 (S504). If the user specifies that execution of the processing is required, the image processing device 100 executes the acquisition processing of the target display 303 (S505). On the other hand, if the user specifies that execution of the processing is not required, the process goes to S508. When the target image 303 is acquired at S505, the image processing device 100 displays an image for requesting the user to choose whether or not saving of the acquired target display 303 is required on the touch panel display 200 (S506). If the user specifies that saving the image is required, the image data of the displayed target image 303 is saved in the storage section 150 (S507).

The image processing device 100 requests the user to choose whether or not to again acquire the pickup image 300 (S508). If the user chooses execution of re-acquisition, the process goes to S501; if the user chooses that re-acquisition is not required, the processing in the image processing device 100 terminates.

Figure 6:
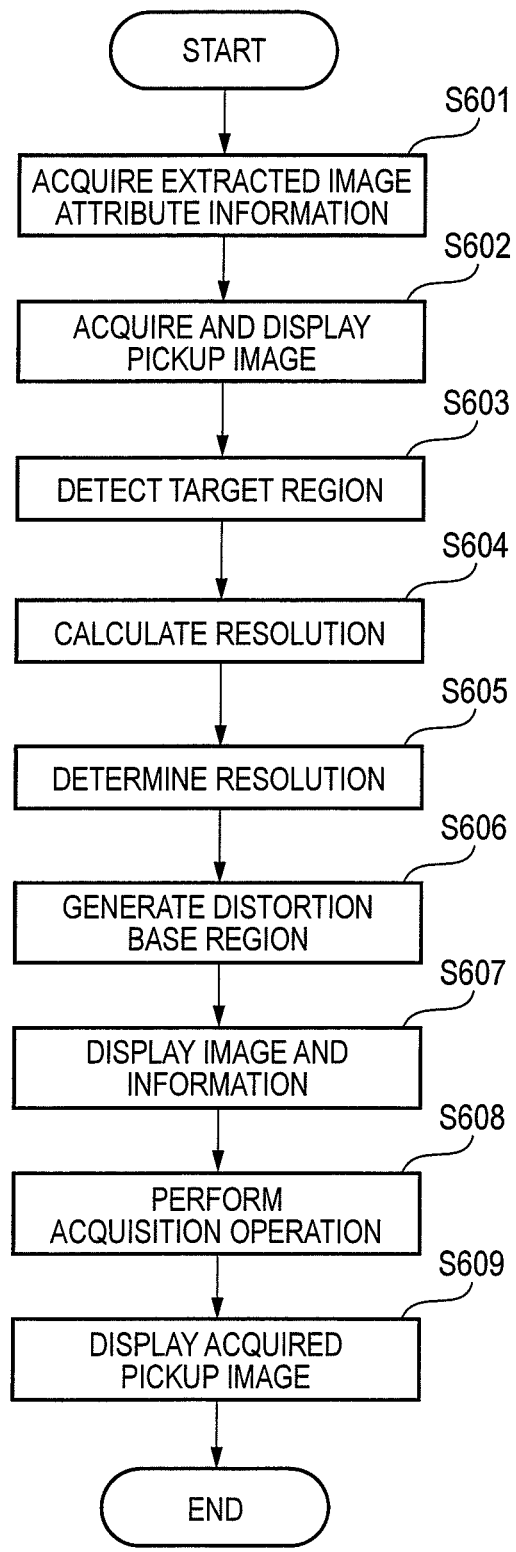
FIG. 6 is a flowchart to show the acquisition processing of a pickup image in the image processing device according to the exemplary embodiment of the invention.

Next, the acquisition processing of the pickup image 300 executed at S501 in FIG. 5 will be discussed with a flowchart. FIG. 6 is a flowchart to show the acquisition processing of the pickup image 300 executed in the image processing device 100 according to the exemplary embodiment of the invention.

First, the extracted image attribute acquisition section 111 of the image processing device 100 displays a menu screen on the touch panel display 200, for example, as shown in FIG. 3 and acquires extracted image attribute information (dimension information and resolution specification information) from operation of the user for the display (S601).

Next, the pickup image 300 is acquired in the image pickup section 130 is acquired based on operation of the user and the acquired pickup image 300 is displayed on the touch panel display at any time (S602).

Next, the region detection section 112 detects the target region 301 in the pickup image 300 acquired at S602 (S603).

The distortion parameter calculation section 113 calculates a distortion parameter of the target region 301 detected at S603. The resolution calculation section 114 calculates (acquires) the resolution of the target region 301 (image quality of the target region 301) and the resolution of the target region 301 when the regions are formed in the dimensions specified in the dimension information based on the distortion parameter (S604).

The resolution determination section 116 determines whether or not the resolution calculated at S604 is equal to or more than the resolution specified by the resolution specification information of the extracted image attribute information input at S601.

The distortion base region calculation section 115 generates information indicating the distortion base region 304 indicating the size of the target region 301 in the pickup image 300 determined based on the resolution specification information using the dimension information of the extracted image attribute information input at S601 and the target region 301 detected at S603 (S606) and outputs the information to the display information generation section 119.

The display information generation section 119 superposes the pickup image 300 acquired at S602 and the distortion base region 304 based on the information generated at S606 and causes the touch panel display 200 to display information in a format as shown in FIG. 4 (S607). Steps S602 to S607 are executed at regular intervals, for example, at intervals of 0.5 seconds and the display is updated at any time.

The user references the information displayed at S607. If the user determines that the pickup image 300 acquired at S602 is to be acquired, the user performs acquisition operation (corresponding to pressing the shutter of the camera) (S608).

If the acquisition operation is performed at S608, the pickup image 300 is acquired and the acquired pickup image 300 is displayed on the touch panel display 200 (S609). The acquisition processing of the pickup image 300 is now complete.

Figure 7:
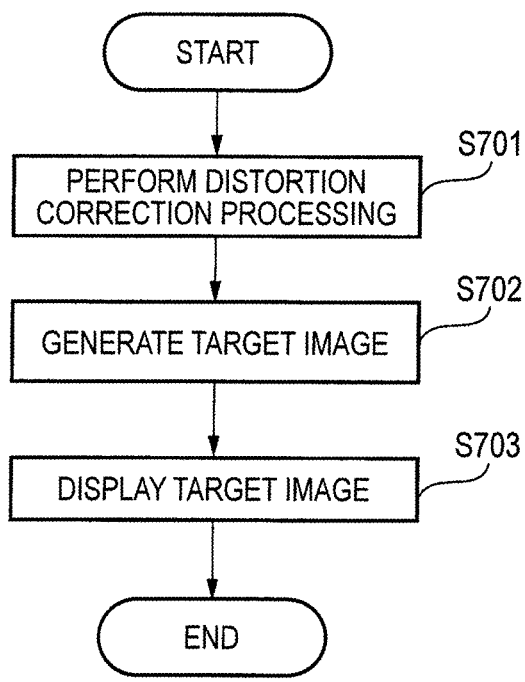
FIG. 7 is a flowchart to show the acquisition processing of a target image in the image processing device according to the exemplary embodiment of the invention.

Next, acquisition processing of the target image 303 executed at S505 in FIG. 5. FIG. 7 is a flowchart to show the acquisition processing of the target image 303 in the image processing device 100 according to the exemplary embodiment of the invention.

When the acquisition processing is started, display of the pickup image 300 at S609 in FIG. 6 is maintained. The geometric correction section 117 performs distortion correction processing for the displayed pickup image 300 (S701). Further, the region extraction section 118 executes region extraction processing and forming processing of forming the pickup image in the dimensions indicated by the dimension information for the pickup image 302 corrected at S701 and generates the target image 303 (S702). Image data indicating the generated target image 303 is output to the display information generation section 119 and the target image 303 is displayed on the touch panel display 200 (S703). The acquisition processing of the target image 303 is now complete.

According to the described configuration, the resolution of the image of the target generated from the image picked up by the image pickup means when the image is formed in predetermined dimensions is acquired.

In the exemplary embodiment described above, the resolution at the position of the shortest diagonal line is calculated as the resolution of the target region 301, but the invention is not limited to the mode. For example, the resolution at the intersection point of diagonal lines may be calculated. If the target region 301 is a quadrangle, the resolution on the position where the ratio of the length to the opposed sides of four sides is the minimum may be calculated.

In the exemplary embodiment described above, the distortion base region 304 is displayed so that the intersection point of the orthogonal lines matches the intersection point of the orthogonal lines of the target region 301, but the invention is not limited to the mode. The distortion base region 304 may be displayed so that the distortion base region 304 and the target region 301 overlap in at least a part, for example, one vertex overlaps. The distortion base region 304 may be displayed at the side of the target region 301.

In the exemplary embodiment described above, the distortion base region 304 or color change in the distortion base region 304 based on the determination result in the resolution determination section 116 is shown as the indication information, but the invention is not limited to the mode. For example, a message of "bring the camera closer to the subject," "again set image pickup condition," etc., may be output by voice based on the determination result in the resolution determination section 116.

In the exemplary embodiment described above, generation of the distortion base area 304 in the acquisition processing of the pickup image 300 and acquisition of the target image 303 in the distortion correction processing are performed automatically, but the invention is not limited to the mode. The user may choose whether or not each processing is required.

In the exemplary embodiment described above, the touch panel display 20 serves as both display means and operation means, but the invention is not limited to the touch panel display. Display means of a liquid crystal display, etc., and operation means of a keyboard, operation keys, etc., may be provided separately.

In the exemplary embodiment described above, the actual dimensions of the target are specified as the dimension information, but the invention is not limited to the mode. For example, the A4 size is specified as the dimension information and then a notice substance of a whiteboard, a poster, etc., may be photographed and the target image 303 with the target scaled down to the A4 size may be generated.

The image processing device 100 is implemented as one function of an information processing device including an image pickup function such as a mobile telephone or a digital camera and is realized by operating a program stored in the storage section of memory of the information processing device. The program may be provided by communications or may be stored in a computer-readable storage medium of a CD-ROM, etc., and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing device comprising:
 a dimension information acquisition unit configured to acquire dimension information specifying dimensions of a target image formed by extracting a target region of a pickup image picked up by an image pickup unit;
 a pickup image quality information acquisition unit configured to acquire pickup image quality information indicating an image quality of the target region of the pickup image; and
 a resolution acquisition unit configured to calculate, in response to the target region of the pickup image being formed in the dimensions, a resolution of the target region of the pickup using the dimension information and the pickup image quality information.

2. The image processing device according to claim 1, wherein the dimension information indicates the actual dimensions of the target region.

3. The image processing device according to claim 1, wherein a shape of the target region is a quadrangle, and wherein
 the resolution calculated by the resolution acquisition unit is set from a resolution on a shorter one of two diagonal lines of the target region.

4. The image processing device according to claim 1, wherein a shape of the target region is a quadrangle, and wherein
 the resolution calculated by the resolution acquisition unit is set from a resolution at a position of an intersection point of two diagonal lines of the target region.

5. The image processing device according to claim 1, wherein a shape of the target region is a quadrangle, and wherein
 the resolution calculated by the resolution acquisition unit is set from a resolution on a position where a ratio of a length to opposed sides of four sides of the target region is the minimum.

6. The image processing device according to claim 1, further comprising:
 a resolution specification information acquisition unit configured to acquire resolution specification information specifying an objective resolution of the target image;

an objective target region information acquisition unit configured to acquire objective target region information indicating the dimensions of the target region in the pickup image, determined based on the resolution specification information; and an objective target region display unit configured to cause a display unit to display an objective target region based on the objective target region information.

7. The image processing device according to claim 1, further comprising:

a resolution specification information acquisition unit configured to acquire resolution specification information specifying an objective resolution of the target image;

a determination unit configured to determine whether or not the resolution when the target image is formed in the dimensions is equal to or more than the objective resolution specified by the resolution specification information; and a determination result display unit configured to cause a display unit to display an image based on the determination result.

8. The image processing device according to claim 1, further comprising:

a correction unit configured to correct the pickup image so that the shape of the target region in the pickup image becomes a shape based on the dimension information.

9. A non-transitory computer readable medium storing a computer readable program executable by a computer for causing a computer to execute a process, the process comprising:

acquiring dimension information specifying the dimensions of a target image formed by extracting a target region of a pickup image picked up by image pickup unit;

acquiring pickup image quality information indicating an image quality of the target region in the pickup image; and calculating, in response to the region of the target being formed in the dimensions, a resolution of the target region of the pickup image based on the dimension information and the pickup image quality information.

10. The image processing device according to claim 1, wherein the image quality of the target region is an acquired resolution of the pickup image, the target region is a quadrangle, and the resolution acquisition unit calculates the resolution of the target region of the pickup image by multiplying the acquired resolution of the pickup image by a length of a first diagonal line in the target region and dividing that result by a length of a second diagonal line corresponding to the first diagonal line in the dimensions indicated by the dimension information.

* * * * *